(12) United States Patent
Mott et al.

(10) Patent No.: US 6,664,920 B1
(45) Date of Patent: Dec. 16, 2003

(54) NEAR-RANGE MICROWAVE DETECTION FOR FREQUENCY-MODULATION CONTINUOUS-WAVE AND STEPPED FREQUENCY RADAR SYSTEMS

(75) Inventors: Charles J. Mott, El Segundo, CA (US); Trung T. Nguyen, Huntington Beach, CA (US); Edmond E. Griffin, II, Rancho Palos Verdes, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/154,051

(22) Filed: Nov. 18, 1993

(51) Int. Cl.$^7$ ............................................... G01S 13/38
(52) U.S. Cl. ........................... 342/129; 342/70; 342/196
(58) Field of Search ........................... 342/128, 70, 129, 342/196

(56) References Cited

U.S. PATENT DOCUMENTS

| | | | | |
|---|---|---|---|---|
| 4,150,375 A | * | 4/1979 | Ross et al. | 342/21 |
| 4,552,456 A | * | 11/1985 | Endo | 342/70 X |
| 5,134,411 A | * | 7/1992 | Adler | 342/130 |
| 5,181,038 A | * | 1/1993 | Asbury et al. | 342/70 |
| 5,189,426 A | * | 2/1993 | Asbury et al. | 342/70 |
| 5,285,207 A | * | 2/1994 | Asbury et al. | 342/129 |
| 5,448,244 A | * | 9/1995 | Komatsu et al. | 342/155 |
| 6,229,475 B1 | * | 5/2001 | Woolley | 342/93 |

OTHER PUBLICATIONS

"A frequency averaging method to improve sea–state measurements with a HF skywave radar", Parent, J.; Antennas and Propagation, IEEE Transactions on [legacy, pre—1988], Vol: 35 Issue: 4, Apr. 1987 Ps: 467–469.*

* cited by examiner

Primary Examiner—John B. Sotomayor
(74) Attorney, Agent, or Firm—Leonard A. Alkov; Glenn H. Lenzen, Jr.

(57) ABSTRACT

A cancellation technique embodied in a system and a radar signal processing method that is employed to detect near-range targets. The present invention uses a frequency-modulation continuous-wave (FMCW) or stepped frequency waveform and is capable of detecting near-range targets that would normally be obscured by transmitter leakage and internal reflections. This cancellation technique works by transmitting one or more reference ramp signals and then subtracting the coherent average of the transmitted reference ramp signals from a group of succeeding transmitted and received ramp return -signals. The resulting group of FM ramp return signals is noncoherently integrated to achieve more stable target detection statistics. More particularly, the present technique implements the following processing steps. Generating a predetermined number of reference ramp signals. Coherently averaging target return signals corresponding to transmitted reference ramp signals to produce a reference average signal. Transmitting additional ramp signals. Subtracting the reference average signal from each ramp return signal to produce a cancelled ramp signal. Fourier transforming each cancelled ramp signal. Magnitude detecting the Fourier transform signal. Noncoherently integrating the magnitude detected signal. Thresholding the integrated signal. Centroiding the thresholded signal, wherein centroid position is indicative of the range to the nearest target. Displaying target data for a target-whose position is less than a predetermined cutoff range.

10 Claims, 3 Drawing Sheets

NEAR-RANGE MICROWAVE DETECTION FOR FREQUENCY-MODULATION CONTINUOUS-WAVE AND STEPPED FREQUENCY RADAR SYSTEMS

BACKGROUND

The present invention relates generally to radar systems, and more particularly, to a system and method for near range microwave detection for use with frequency-modulation continuous-wave (FMCW) and stepped frequency radar systems.

Several partial solutions exist for the well-known near-range FMCW detection problem. These include physically separating the transmit and receive antennas to improve isolation, cancellation of leakage by analog hardware methods, minimizing internal reflections within the system, and increasing FM ramp bandwidth. Having physically distinct transmit and receive antennas increases hardware complexity, size and cost, as does hardware cancellation. Hardware cancellation and minimization of internal reflections are unattractive for mass-production. These techniques are available but can not be implemented in an automotive product:because of cost, size and the difficulties of mass production. Increasing FM ramp bandwidth is often precluded by FCC regulations or may require operation in an alternative frequency band where microwave components are less producible.

Consequently, it is an objective of the present invention to provide for a system and method based on waveform design and digital signal processing that provides for detection of near-range targets using a frequency-modulation continuous-wave (FMCW) or stepped frequency radar and that overcomes the above-mentioned problems and limitations.

SUMMARY OF THE INVENTION

In order to meet the above and other objectives, the present invention employs a cancellation procedure embodied in a digital signal processor of a radar system that is used to detect near-range targets. It was previously assumed that it was not possible to detect targets in the "first range bin" formed by processing the return of an FMCW waveform. The present invention allows for detection of targets within this regime, thus permitting the use of a narrower bandwidth system for a given near obstacle range.

The present system and method uses a frequency-modulation continuous-wave (FMCW) or stepped frequency waveform to detect targets that would normally be obscured by transmitter leakage and internal reflections. The cancellation procedure is implemented by transmitting one or more reference ramp signals and then subtracting the coherent average of the transmitted reference ramp signals from each signal in a group of succeeding transmitted and received ramp signals. The resulting group of FM ramp return signals is then noncoherently integrated to achieve more stable target detection statistics and to provide for detection of nearby targets.

In its simplest form, the present invention is a method of detecting near range targets for use with frequency modulation continuous wave (FMCW) and stepped frequency waveforms. The method comprises the steps of: transmitting reference ramp signals; receiving reference ramp return signals; determining a coherent average of the received reference ramp return signals; subtracting a coherent average of the transmitted reference ramp signals from each signal in a group of succeeding reference ramp return signals to produce cancelled ramp signals; noncoherently integrating the resulting cancelled ramp signals to provide for detection of nearby targets; and displaying target data for a target whose position is less than a predetermined range.

More particularly, one detailed method of providing near range detection of targets for use with frequency-modulation continuous-wave (FMCW) and stepped frequency radar systems in accordance with the present invention comprises the following steps. Generating a predetermined number of reference ramp signals. Coherently averaging target return signals corresponding to transmitted reference ramp signals in the time domain to produce a reference average signal. Storing the resulting reference average signal. Transmitting an additional number of ramp signals. Subtracting the reference average signal from each ramp signal as it is received. Generating a Fourier transform signal for each ramp signal. Magnitude detecting the Fourier transformed signal. Noncoherently integrating the magnitude detected signal. Thresholding the integrated signal. Centroiding the thresholded signal, wherein centroid position is indicative of the range to a target. Displaying target data for a target whose range is less than a predetermined cutoff range.

In its simplest embodiment, the present invention is a radar system that provides for near range detection of targets for use with frequency modulation continuous wave (FMCW) and stepped frequency waveforms. The system comprises transceiver for transmitting reference ramp signals and receiving reference ramp return signals. A signal processing is coupled to the transceiver and provides for (a) determining a coherent average of the received reference ramp return signals; (b) subtracting a coherent average of the transmitted reference ramp signals from each signal in a group of succeeding reference ramp return signals; and (c) noncoherently integrating the resulting group of reference ramp return signals to provide for detection of nearby targets. A display is coupled to the signal processor for displaying detected targets.

A detailed embodiment of a radar system that provides for near range detection of targets in accordance with the present invention comprises an antenna/transceiver assembly, analog to digital conversion circuitry, and a digital signal processor. The antenna/transceiver assembly is conventional and comprises a transmit antenna, a receive antenna, a voltage controlled oscillator, a power divider having an input coupled between an output of the voltage controlled oscillator and the transmit antenna, a low noise amplifier coupled to an output of the receive antenna, and a homodyne mixer coupled to an output of the low noise amplifier and to a second output of the power divider. The analog to digital conversion circuitry comprises a D/A converter having an input coupled to the voltage controlled oscillator, and an A/D converter having an input coupled an output of the mixer.

The digital signal processor implements the improvement provided by the present invention and comprises waveform control circuitry that is coupled to the D/A converter and which is adapted to generate the ramp signals. A coherent average reference signal generator and a cancellation algorithm operate on data received from the A/D converter. The coherent average reference signal generator is adapted to generate and store the reference average signal from the received target return signals. The coherent average reference signal generator data is coupled to the cancellation circuit and is adapted to couple the reference average signal thereto for subtraction from each received ramp signal. A zero-padded fast Fourier transform (FFT) filter is coupled to the cancellation circuit that Fourier transforms each ramp signal. The Fourier transformed ramp signal is then serially processed by a magnitude detection unit, a noncoherent integrator, a thresholding unit, a centroiding unit, and a range cut-off unit. A display is coupled to an output of the range cut-off unit for displaying target data whose position is less than a predetermined cutoff range.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
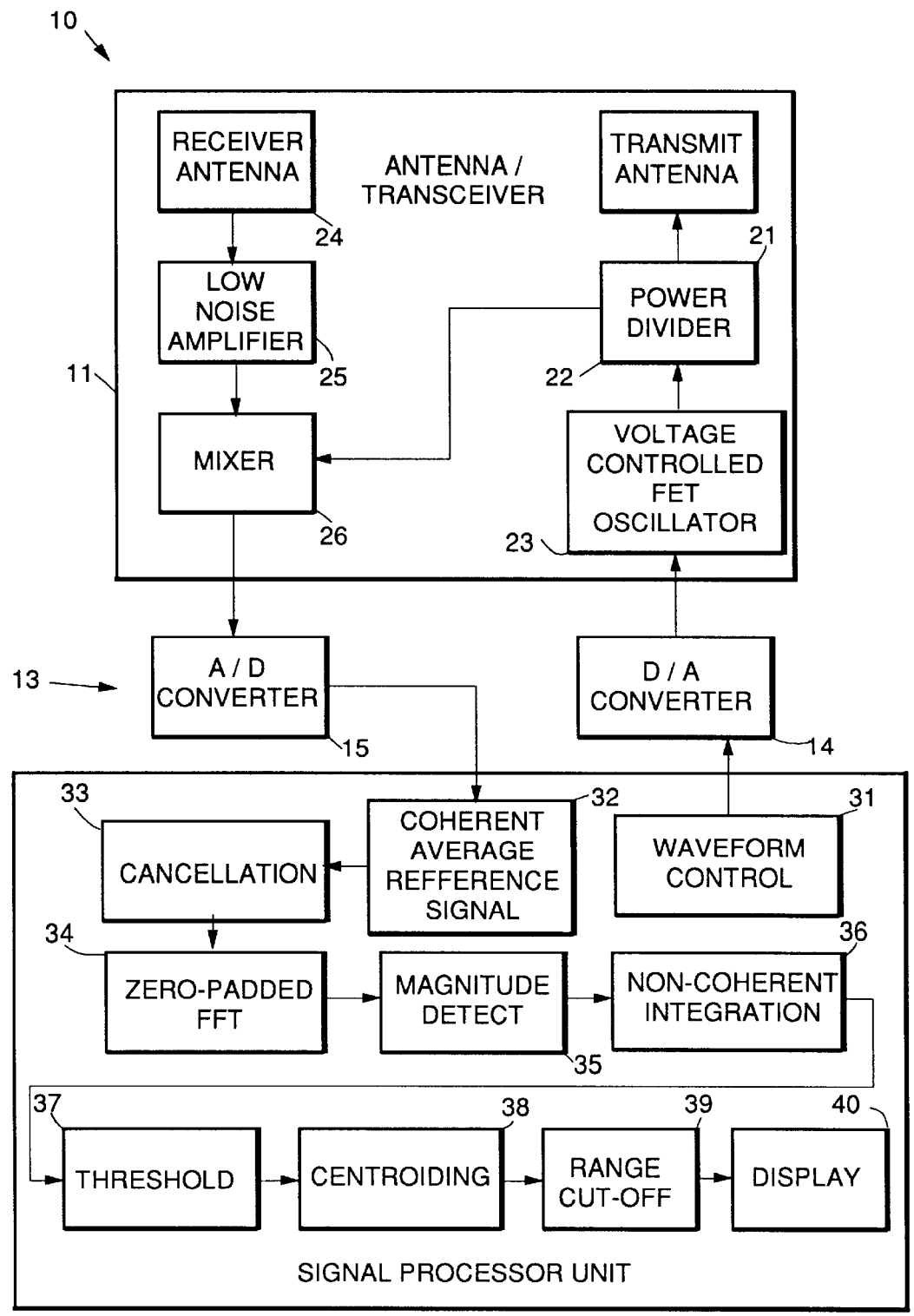
FIG. 1 illustrates a system block diagram of a frequency-modulation continuous-wave (FMCW) radar system employing a near range microwave detection technique in accordance with the present invention.

Referring to the drawing figures, FIG. 1 illustrates a system block diagram of a frequency-modulation continuous-wave (FMCW) radar system 10 employing near range microwave detection processing in accordance with the present invention. The system 10 is comprised of three main parts: an antenna/transceiver assembly 11, a digital signal processor 12, and an analog/digital conversion section 13 comprised of D/A and A/D converters 14, 15.

The antenna/transceiver assembly 11 is generally conventional, and comprises a voltage controlled oscillator (VCO) 23 which has an input coupled to the D/A converter 14 and an output coupled to a power divider 22. One output of the power divider 22 is coupled to the transmit antenna 21 that is adapted to transmit radar signals. A receive antenna 24 is coupled by way of a low noise amplifier 25 to a homodyne mixer 26 which is also coupled to the power divider 22. The output of the mixer 26 is coupled to the A/D converter 15.

The digital signal processor 12 is comprised of a waveform control circuitry 31 that is coupled to the D/A converter 14 and which is adapted to generate ramp signals that are subsequently transmitted by the transmit antenna 21. The A/D converter 15 is coupled to a coherent average reference signal generator 32 and to a cancellation unit 33. The coherent average reference signal generator 32 is adapted to process a plurality of received reference ramp signals to produce a reference average signal therefrom. The output of the coherent average reference signal generator 32 is coupled to the cancellation unit 33. The cancellation circuit 33 is adapted to subtract the reference average signal from each processed target return signal. The output of the cancellation unit 33 is serially coupled through a zero-padded fast Fourier transform (FFT) filter 34, a magnitude detection unit 35, and a noncoherent integrator 36. Output signals from the noncoherent integrator 36 are serially processed by a thresholding unit 37, a centroiding unit 38, and finally by a range cut-off unit 39 whose output is coupled to a display 40 for target positions that are less than a predetermined cut-off range.

Figure 2:
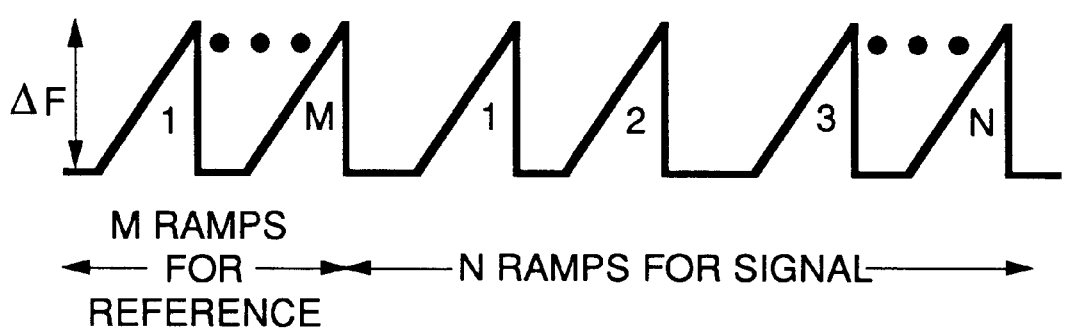
FIG. 2 shows the waveform transmitted by the system of FIG. 1.

The novelty of the present invention lies in the application of digital signal processing and waveform control to solve the near-range FMCW detection problem. The digital processor 12 generates and transmits ramp signals that are communicated by way of the D/A converter 14, the VCO 23, and the power divider 22 to the transmit antenna in the antenna/transceiver assembly 11. The digital processor 12 captures received radar target return data out of the homodyne mixer 26 using the A/D converter 15. For clarity, the transmitted ramp waveform generated by the signal processor 12 is shown in FIG. 2. Referring to FIG. 2, one to several reference ramp signals (denoted by M) are transmitted, and return ramp signals reflected from a target are coherently averaged in the time domain, and the result (the reference average) is stored for subsequent processing in the cancellation circuit 33. Then an additional number of ramp signals (denoted by N) are transmitted, and the reference average is subtracted from each ramp signal as it is received. A discrete Fourier transform (with zero-padding ratio P) is then generated in the FFT filter 34 for each ramp signal followed by magnitude detection and noncoherent integration of outputs of the Fourier transform filter 34 using the magnitude detection and noncoherent integration units 35, 36. Thresholding and centroiding of the outputs of the FFT filter 34 that exceed this threshold over a given range swath then occur in the thresholding and centroiding units 37, 38. The centroid position gives the range of a nearest target. If the range of the target is less than a predetermined cutoff range determined by the range cutoff unit 39, then target data is displayed on the display 40.

Figure 3:
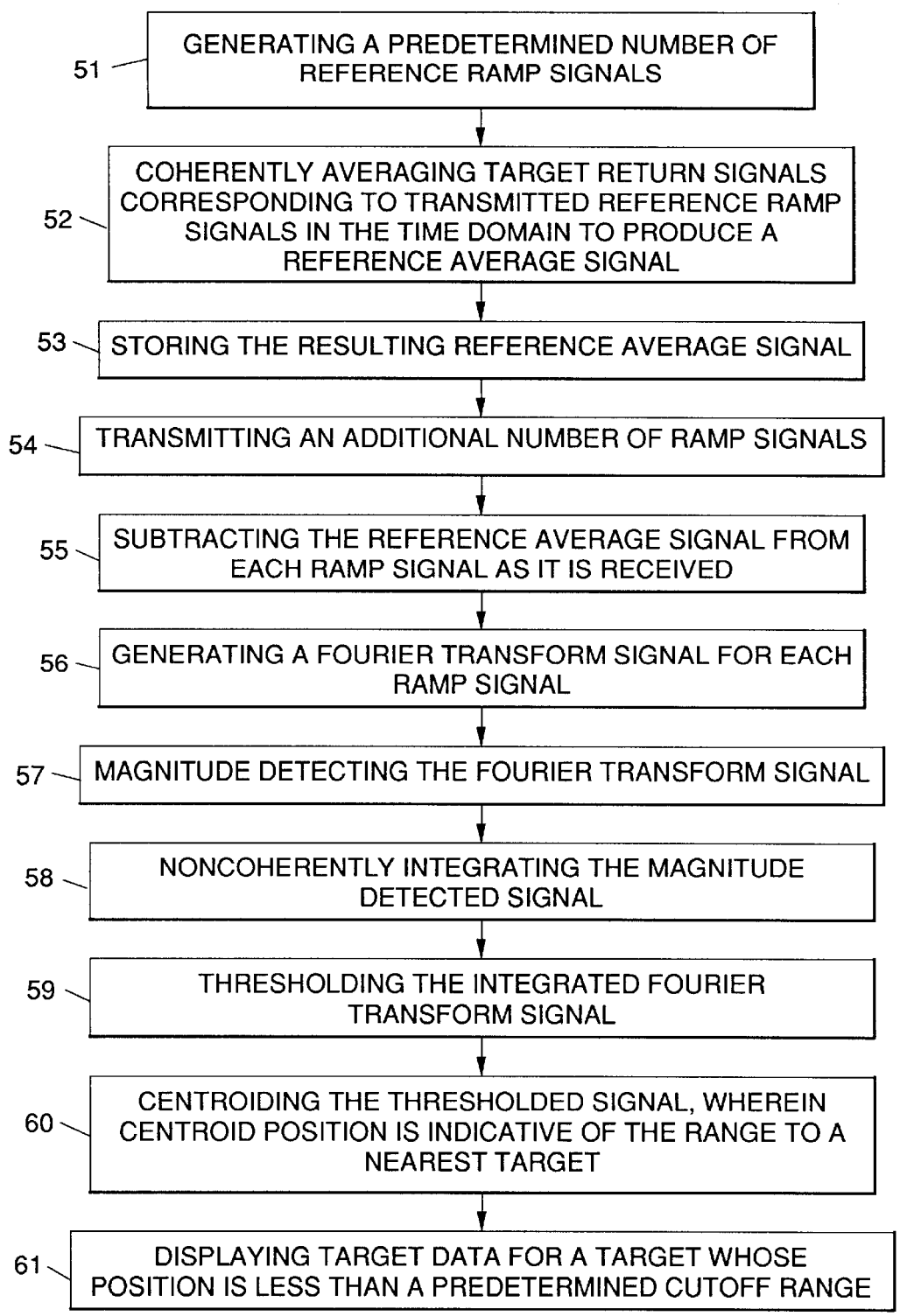
FIG. 3 shows a processing method in accordance with the present invention.

From the above, it should be clear that the present invention also provides for a processing method 50 which is detailed in FIG. 3 and which will now be described. The first step comprises generating a predetermined number of reference ramp signals, as is indicated in step 51. The next step is to coherently average target return signals derived from the reference ramp signals in the time domain to produce a reference average signal, as is indicated in step 52. The next step is to store the reference average signal, as is indicated in step 53. The next step is to transmit an additional number of ramp signals, as is indicated in step 54. The next step is to subtract the reference average from each ramp signal as it is received, as is indicated in step 55. The next step is to generate the Fourier transform of each ramp signal, as is indicated in step 56. The next step is to magnitude detect the Fourier transformed signal, as is indicated in step 57. The next step is to noncoherently integrate the magnitude detected signal, as is indicated in step 58. The next step is to threshold the integrated signal, as is indicated in step 59. The next step is to centroid the thresholded signal, as is indicated in step 60. The centroid position gives the range of the nearest target. The last step is to display target data for a target whose position is less than a predetermined cutoff range, as is indicated in step 61.

The advantage of the present invention is that it allows detection of near range targets while rejecting interference from large but distant targets using the inherent characteristics of the FMCW waveform. Rejecting targets at a range further than desired is a crucial measure of blind zone sensors used in close proximity radar systems such as are required for automobiles. Also, the present processing approach is useful in systems where an FMCW waveform is used to accurately range distant objects, but where it is desirable to detect nearby objects. This allows the system 10 to operate in stop-and-go traffic, and warn an operator of potentially hazardous conditions, such as vehicle cut-in scenarios.

The processing approach of the present invention described herein has many variable processing parameters, including the number of reference ramp signals, number of detection ramp signals, zero padding ratio, and the overall processing interval. Individual ramp signals of the waveform do not have to be evenly spaced nor be immediately adjacent to each other. In fact, jittered spacing of ramps may be useful in dealing with mutual interference. Processing parameters along with thresholding and centroiding processes may be adjusted based on expected target cross-sections and the characteristics of the antenna/transceiver assembly 11. Target detection in the near zone is dependent on relative movement. However, waveform and processing parameters (especially the overall processing interval) may be adjusted so that the amount of relative movement required for detection is small enough to be satisfactory for many applications.

The above-described invention has been reduced to practice in the form of a testbed utilizing a personal computer, a digital signal processing card comprising the processor 12 disposed in the computer, and a 10.5 GHz antenna/transceiver assembly 11. This testbed has been tested in a laboratory environment and has been installed in a van for road testing purposes. The purpose of the van testing was to evaluate suitability of the invention for the automotive blind zone detection. The testbed performed successfully, without a single missed detection of a vehicle travelling in the same direction as the van.

Several homodyne FMCW radars for automotive applications are currently under development by the assignee of the present invention and its affiliates. These applications require near range operation of the radars. Production of a blind zone detection system utilizing the 50 MHz FCC window at 10.5 GHz is made feasible by the present invention. It had been previously thought that a wider bandwidth system was required for this task, such as a 24 GHz system with a 250 MHz FCC window. The present invention reduces the risk associated with manufacturing microwave components at 24 GHz by providing a system operating at 10.5 GHz combined with improved signal processing. Additionally, detection of targets within the first several range bins is very desirable. In addition to detecting near-range targets, the present invention simplifies the detection logic (association logic) required to eliminate false alarms.

Thus there has been described a new and improved system and method that provides for near range detection of targets for use with frequency-modulation continuous-wave (FMCW) and stepped frequency radar systems. It is to be understood that the above-described embodiments are merely illustrative of some of the many specific embodiments that represent applications of the principles of the present invention. Clearly, numerous and other arrangements can be readily devised by those skilled in the art without departing from the scope of the invention. For example, he number of reference ramp signals, the number of detection ramp signals, the zero padding ratio, and the processing interval may be varied. These processing parameters and the thresholding and centroiding processes may be adjusted based on expected target cross-sections and the characteristics of the antenna/transceiver assembly.

What is claimed is:

1. A radar system that provides for near range detection of targets for use with frequency modulation continuous wave (FMCW) and stepped frequency waveforms, said system comprising:
   transceiver means for transmitting reference ramp signals and receiving reference ramp return signals; and
   signal processing means for:

(a) determining a coherent average of the received reference ramp return signals;
   (b) subtracting a coherent average of the transmitted reference ramp signals from each signal in a group of succeeding reference ramp return signals; and
   (c) noncoherently integrating the resulting group of reference ramp return signals to provide for detection of nearby targets; and
   a display for displaying detected targets.

2. The radar system of claim 1 wherein the signal processing means further comprises means for setting a predetermined cut-off range for detection of the nearby targets.

3. The radar system of claim 1 wherein the transceiver means comprises an antenna/transceiver assembly that is adapted to transmit and receive a selected radar waveform comprising a frequency modulation continuous wave (FMCW) or a stepped frequency waveform.

4. The radar system of claim 3 wherein the transceiver means comprises analog to digital conversion circuitry comprising an A/D converter for processing a selected radar waveform that is to be transmitted by the antenna/transceiver assembly and a D/A converter for processing radar return signal comprising received radar waveforms.

5. The radar system of claim 4 wherein the signal processing means further comprises:
   waveform control means for generating ramp signals comprising the selected radar waveform;
   Fourier transform means for Fourier transforming each cancelled ramp signal;
   magnitude detection means coupled to the Fourier transform means for magnitude detecting the Fourier transformed signal;
   thresholding means for thresholding the noncoherently integrated signal; and
   centroiding means for centroiding the thresholded signal, wherein centroid position is indicative of the range to a nearest target.

6. The radar system of claim 1 wherein the signal processing means further comprises:
   waveform control means for generating ramp signals comprising the selected radar waveform;
   Fourier transform means for Fourier transforming each cancelled ramp signal;
   magnitude detection means coupled to the Fourier transform means for magnitude detecting the Fourier transformed signal;
   thresholding means for thresholding the noncoherently integrated signal; and
   centroiding means for centroiding the thresholded signal, wherein centroid position is indicative of the range to a nearest target.

7. A method of detecting near range targets for use with frequency modulation continuous wave (FMCW) and stepped frequency waveforms, said method comprising the steps of:
   transmitting reference ramp signals;
   receiving reference ramp return signals;
   determining a coherent average of the received reference ramp return signals;
   subtracting a coherent average of the transmitted reference ramp signals from each signal in a group of succeeding reference ramp return signals to produce cancelled ramp signals;
   noncoherently integrating the resulting cancelled ramp signals to provide for detection of nearby targets; and displaying target data for a target whose position is less than a predetermined range.

8. The method of claim 7 which further comprises the step of setting a predetermined cut-off range for detection of the nearby targets.

9. The method of claim 8 which further comprises the steps of:

Fourier transforming each cancelled ramp signal;

magnitude detecting the Fourier transformed signal;

thresholding the noncoherently integrated signal; and centroiding the thresholded signal, wherein centroid position is indicative of the range to a nearest target.

10. A method of detecting near range targets for use with frequency modulation continuous wave (FMCW) and stepped frequency waveforms, said method comprising the steps of:

transmitting a predetermined number of reference ramp signals;

coherently averaging target return signals derived from the transmitted reference ramp signals to produce a reference average signal;

transmitting additional ramp signals;

subtracting the reference average signal from each target return signal derived from the additional ramp signals to produce a cancelled ramp signal;

Fourier transforming each cancelled ramp signal;

magnitude detecting the Fourier transformed signal;

noncoherently integrating the magnitude detected signal;

thresholding the noncoherently integrated signal;

centroiding the thresholded signal, wherein centroid position is indicative of the range to a nearest target; and displaying target data for a target whose position is less than a predetermined cutoff range.

* * * * *